Figure 1:
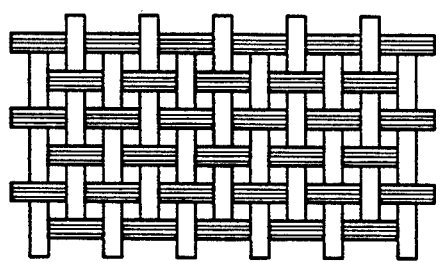

United States Patent [19]

Keating et al.

[11] Patent Number: 5,168,005
[45] Date of Patent: Dec. 1, 1992

[54] MULTIAXIALLY REINFORCED MEMBRANE

[75] Inventors: James T. Keating; Peter Popper, both of Wilmington, Del.

[73] Assignee: E. I. Du Pont de Nemours and Company, Wilmington, Del.

[21] Appl. No.: 631,431

[22] Filed: Dec. 21, 1990

[51] Int. Cl.⁵ .............................................. C25B 1/16
[52] U.S. Cl. .................................. 428/229; 428/224; 428/244; 428/257; 428/258; 428/259; 429/31; 521/27; 204/98; 75/412
[58] Field of Search .............. 521/27; 429/31; 204/98; 75/412; 526/243; 428/224, 244, 257, 258, 259, 229

[56] References Cited

U.S. PATENT DOCUMENTS

| 4,072,793 | 2/1978 | Watanabe et al. | 428/255 |
| 4,595,476 | 6/1986 | Bissot | 521/27 |
| 4,964,960 | 10/1990 | Keating et al. | 521/37 |

OTHER PUBLICATIONS

Scardino, "New Multidimensional Fabric Technologies and their end-uses" Apr. 1985, pp. 268-271 (E28-29), Chemiefasem/Texlilindustrie.

Primary Examiner—Patrick J. Ryan
Assistant Examiner—Richard C. Weisberger

[57] ABSTRACT

An ion exchange membrane reinforced with a multiaxial, preferably triaxial, yarn system and an electrolysis process using the membrane in its highly-fluorinated cation exchange form.

17 Claims, 1 Drawing Sheet

MULTIAXIALLY REINFORCED MEMBRANE

FIELD OF INVENTION

The present invention relates to chemically resistant multiaxially reinforced cation and anion exchange membranes and their use as a separator in electrolytic cells.

BACKGROUND

Alkali metal chlorides, such as sodium chloride (NaCl) and potassium chloride (KCl), are commercially electrolyzed using cation exchange membranes to make chlorine and either sodium hydroxide (NaOH) or potassium hydroxide (KOH). The state-of-the-art process for such a chloralkali electrolysis is membrane electrolysis, in which a non-porous membrane separates the anode chamber and the cathode chamber. To minimize power consumption, it is important to maximize current efficiency and to minimize cell voltage. Membranes are commonly reinforced with a chemical-resistant fabric to improve tear strength, burst strength, and dimensional stability.

In order to obtain a low cell voltage in a chloralkali cell along with good stability for handling the reinforcing fabric and the reinforced membrane, it is desirable to have an open reinforcing fabric and a thin membrane. A thin membrane requires a thin fabric and a small total thickness of the film layers used in laminating the reinforced cation exchange resin.

An open fabric is one which, when illuminated from a direction perpendicular to the plane of the fabric, allows a large amount of the incident light to pass through the fabric. In other words, it is a fabric with a large percentage of open spaces. This is desirable because it is the open spaces which allow cations to pass from the anolyte to the catholyte in the chloralkali process. Thus, an open fabric makes possible a lower cell voltage and therefore a lower power consumption.

The simplest kind of fabric is one with a plain weave, shown in FIG. 1. If it is made with high openness—a small number of yarns in each direction—the fabric lacks dimensional stability and may stretch out of shape. For example, if a square piece is suspended from one corner, it will distort and no longer be square and flat. Stated another way, a membrane reinforced with such an open plain weave fabric is dimensionally unstable. This is a serious problem during assembly of commercial cells, particularly those which may require large membranes, some of which are as large as 1.5×3.7 meters (m), and those in which vertical assembly is employed.

Figure 2:
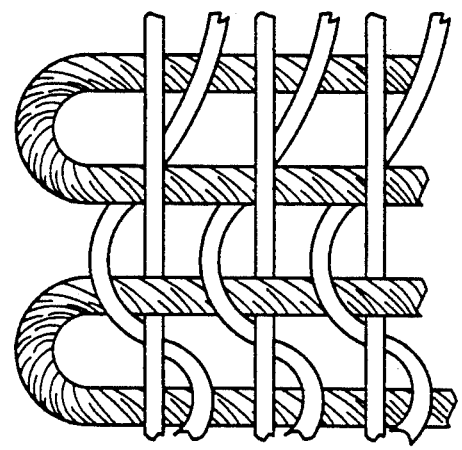

In order to make a more open fabric with uniform open spaces than is feasible with a plain weave, considerable attention has been given to leno weave fabrics, shown in FIG. 2. For example, U.S. Pat. No. 4,072,793 teaches the use of leno weave fabrics. However, as can be seen from FIG. 2, the fabric tends to be thick at the point where two warp yarns cross a filling yarn at about the same place. Thick fabrics are generally considered undesirable because they require a large amount of polymer to cover the fabric on both sides of the membrane. If the yarn penetrates the surface of the membrane, it tends to cause leakage from one electrolyte to the other along voids that result because adhesion of the polymer to the yarn is imperfect. Leakage of catholyte into the anolyte causes low current efficiency and high power consumption along with other problems. Leakage of anolyte into the catholyte may lead to amounts of chloride in the caustic product which exceed customer requirements.

Although leno weaves provide an improvement over plain weaves, they too are biaxial structures that suffer from low modulus and strength in the bias direction.

The present invention solves this problem.

Multiaxial fabrics may be made by any of the technologies as described in Scardino, *Chemiefasern/Textilindustrie*, Vol. 35/87 (April, 1985), pp. 268-271. One is multiaxial stitchthrough technology, another is multiaxial non-woven technology, and a third is triaxial woven technology. Others include braided, interstitched and interknitted. Yarns are generally held together by interlacing or interlooping, but, in the case of non-woven yarn systems, are bonded together.

Figure 3:
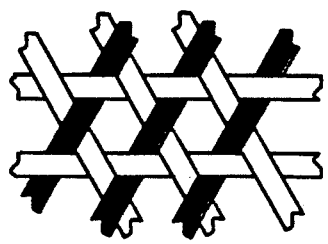

A triaxial woven fabric, FIG. 3, is a fabric made in a weaving process employing three yarns at 60° angles to each other. The present inventors have found that the preferred triaxial fabric, especially if made of low denier yarns, is a thin fabric stable under various stresses even if the fabric is of high openness. Similarly, the reinforced membrane is stable during handling and installation, under the forces of shrinkage and expansion inside the electrolyzer, and during disassembly of the cell, allowing a higher percentage of the membrane to be reinstalled and reused. Furthermore, the dimensional stability of the membrane in all directions means that a piece for use in an electrolyzer can be cut to avoid a flaw in the roll of reinforced membrane, even if the piece is cut on the bias or at an acute angle to the machine direction. In the case of plain weave, the piece of membrane must be cut parallel or perpendicular to the machine direction in order to have dimensional stability in both the length and breadth of the piece.

Additionally, membrane reinforced with triaxial fabric is superior in resistance to "pin holes" or, in other words, tiny holes in the membrane which allow leakage of one electrolyte into the other electrolyte. When membranes of the prior art are pretreated with a dilute base or salt to expand them and convert them to the desired ionic form (usually the $Na^+$ form) and then spread horizontally, while wet and limp, onto an electrode during assembly of the cell, tiny crimps may occur. These become tiny cracks that become pin holes. The membrane of the present invention is superior in this respect.

SUMMARY OF THE INVENTION

The present invention is an open multiaxially, preferably triaxially, reinforced membrane, preferably a highly fluorinated cation exchange membrane in which the reinforcement is made of yarns of a polymer resistant to chlorine, sodium hypochlorite, and concentrated sodium hydroxide at a temperature of at least 100° C.

Preferably the yarns are perfluorinated and have an aspect ratio of 2-20, preferably 5-10. The fabric openness should be 40-95%, preferably 60-85%. The yarn denier should be 5-400, preferably 25-200.

The membranes of this invention overcome the inherent problem that biaxially-reinforced membranes have, namely low modulus in the bias direction.

In other embodiments, the invention is a process for the electrolysis of an alkali metal chloride using a highly fluorinated cation exchange membrane reinforced with the multiaxial fabric.

FIGURES

FIG. 1 depicts a plain-weave fabric.
FIG. 2 depicts a leno-weave fabric.
FIG. 3 depicts a triaxial-weave fabric preferred in this invention.

DETAILS OF THE INVENTION

In order to minimize the cell voltage in electrolysis, the fabric should be quite open, suitably 40-95% open, preferably 60-85% open. As described above, openness is a measure of the open spaces between the yarns of the fabric as a percentage of the total fabric area.

High openness can be more readily achieved when fine yarns are used in the fabric. Suitable yarn dimensions are 5-400 denier, denier being the weight in grams of 9000 meters of yarn. Preferably, the yarn is 25-200 denier.

In order to minimize the overall thickness of the reinforced membrane, the fabric should be as thin as possible. The fabric thickness can be minimized by calendering the fabric before it is laminated into the membrane structure. When the fabric is thin, it is possible to make the overall thickness of the membrane smaller without having the yarns penetrate the membrane surface. This not only saves cation exchange resin, but decreases the cell voltage.

In order further to minimize cell voltage, sacrificial yarns may be included in the fabric along with corrosion-resistant yarns. They may be the yarns that hold yarns together as by interlacing or they may be some of the yarns that are part of the multiaxial pattern itself. After the fabric has been laminated into a membrane, the sacrificial yarns can be removed by dissolving them in a suitable liquid or by hydrolyzing them to small fragments which can be removed from the membrane. The concept of the use of sacrificial yarns in bimembranes (membranes having layers of two different polymers) and suggestions for what materials to use for sacrificial yarns and for dissolving the sacrificial yarns are disclosed in U.S. Pat. No. 4,437,951.

This reference also points out that the overall thickness of the fabric and therefore of the membrane can be minimized by using oval or rectangular cross-sectional yarns in making the fabric. The degree of rectangularity is defined as aspect ratio, or the ratio of the long to the short dimension of the cross section of the yarn.

The yarns used in making the fabric of the present invention may be monofilaments, multifilaments, or slit film. They may be of ordinary round cross-section or may have specialized cross-sections. Oblong or rectangular cross-sections, if suitably oriented to the membrane, make it possible to get more reinforcing action with a thinner overall membrane. Even with a cloth or mesh of fluorocarbon yarns, it is preferred not to have the yarn or fiber in the yarn penetrate the surface of the membrane on the cathode side. The fabric employed may be calendered before lamination to reduce its thickness, or it may be heatset to reduce dimensional change during lamination. In a bimembrane, described below, the fabric may be in the sulfonate or carboxylate layer, or in both, but is more often in the sulfonate layer, which is usually thicker.

The polymer used to make the reinforcing yarns must be resistant for an indefinite time to the chemical action of the chemicals present in a chloralkali cell at its operating temperature, which often approaches 100° C. To achieve this, it is suitable to use a highly fluorinated polymer, in which at least 90% of the carbon-hydrogen (C—H) bonds have been replaced with C-halogen bonds. The halogen is preferably chlorine (Cl) or flourine (F), and more preferably is F. Most preferably, there are no C—H bonds in the polymer, because perhalogenated and especially perfluorinated polymers have the best resistance to heat and chemicals. It is customary to use a fabric made of a fluorocarbon resin such as polytetrafluoroethylene or a melt-processable copolymer of tetrafluoroethylene with hexafluoropropylene or with perfluoro(propyl vinyl ether). It is also possible to use oriented, hydrolyzed yarns of a fluorinated, preferably perfluorinated, copolymer containing functional groups such as —SO$_3$Na or —COONa after hydrolysis. The use of such cation exchange yarns is disclosed in U.S. Ser. No. 07/316,630, filed Feb. 28, 1989.

The carboxylic polymer or polymers of which the membrane layer in contact with the catholyte is usually made have a fluorinated hydrocarbon backbone chain to which are attached side chains carrying certain functional groups hydrolyzable in the alkaline medium to carboxylate groups, such as nitrile or particularly ester groups. Those polymers include, e.g., those containing the

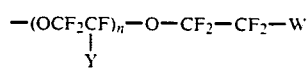

side chains, where Y is F or CF$_3$; n is 0, 1, or 2; and W is COOR or —CN, where R is lower alkyl. Such polymers are described in U.S. Pat. No. 4,138,246. Among these polymers, those with n=1 and Y=CF$_3$ are preferred.

Preferably, the membrane used in the electrolytic cells according to the process of this invention comprises at least two layers, at least one layer in contact with the anolyte having pendant sulfonyl groups.

A membrane having at least one layer of a copolymer having sulfonyl groups in melt-fabricable form and a layer of a copolymer having carboxyl groups in melt-fabricable form, such as made by coextrusion, can be used as one of the component films in making the membrane to be used in the process of the present invention. Such a laminated structure will be occasionally referred to herein as a bimembrane. Bimembranes are well known in the art.

The sulfonyl polymers of which at least one membrane layer in contact with the anolyte according to this invention can be made are fluorinated polymers with side chains containing the group —CF$_2$CFR'SO$_2$X, wherein R' is F, Cl, CF$_2$Cl or a C$_1$ to C$_{10}$ perfluoroalkyl radical, and X is F or Cl, preferably F. Ordinarily, the side chains will contain —OCF$_2$CF$_2$CF$_2$SO$_2$X or —OCF$_2$CF$_2$SO$_2$F groups, preferably the latter. The perfluorinated polymers are preferred.

Polymers containing the side chain

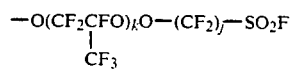

where k is 0 or 1 and j is 3, 4, or 5, may be used. These are described in U.S. Pat. No. 4,329,435 (Kimoto et al., assigned to Asahi Chemical).

Polymers containing the side chain —$CF_2CF_2SO_2X$ are described in U.S. Pat. No. 3,718,627 (Grot, assigned to Du Pont).

Preferred polymers contain the side chain —$(OCF_2CFY)_r$—$OCF_2CFR'SO_2X$, where R', Y, and X are as defined above; and r is 0, 1, 2, or 3. Some of those polymers are described in U.S. Pat. No. 3,282,875 (Connolly et al., assigned to Du Pont). Especially preferred are copolymers containing the side chain

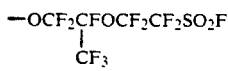

The sulfonyl polymers may be blends of sulfonyl polymers. The carboxyl polymers may be blends of carboxyl polymers. The membrane may comprise a blend of sulfonyl and carboxyl polymers.

Polymerization can be carried out by the methods described in the above references. Especially useful is solution polymerization using 1,2,2-trichloro-2,1,1-trifluoroethane as the solvent and perfluoropropionyl peroxide as the initiator. Polymerization can also be carried out by aqueous granular polymerization.

The copolymers used in the manufacture of membrane layers used in the process of the present invention should be of high enough molecular weight to produce films which are self-supporting in both their melt-fabricable (precursor) form and in the hydrolyzed ion exchange form.

It is in fact preferred to use in the electrolysis of alkali metal chlorides process a carboxyl/sulfonyl bimembrane, and it is possible for the sulfonyl layer to have an equivalent weight lower than that of the carboxyl layer by at least 50 units.

It is also possible to use an all-carboxyl membrane with a layer of lower equivalent weight on the anolyte side.

The membrane used in this invention may also comprise three layers:

a) on the catholyte side, a carboxyl layer of a 5-50 micrometer thickness, preferably 20-40 micrometers, with an equivalent weight suitable to provide a water transport of 3.0-4.0 moles of water per gramatom of Na, b) in the middle, an optional carboxyl layer with a lower equivalent weight and a thickness in the same range, as that of (a), and c) on the anolyte side, a sulfonyl layer of a 50-250 micrometer thickness, preferably 75-100 micrometers.

Another three-layer membrane used in J 63/310988 (assigned to Asahi Glass) to make concentrated NaOH has a carboxyl layer sandwiched between two sulfonic layers.

Membranes usually have an overall thickness of 50-300 micrometers, especially 125-200 micrometers.

The customary way to specify the structural composition of films or membranes in this field is to specify the polymer composition, ion-exchange capacity or equivalent weight, and thickness of the polymer films in melt-fabricable form, from which the membrane is fabricated. This is done because the measured thickness varies depending on whether the membrane is dry or swollen with water or an electrolyte, and even on the ionic species and ionic strength of the electrolyte, even though the amount of polymer remains constant.

For use in electrolysis of brine, the membrane should have all of the functional groups converted to ionizable functional groups. These will be sulfonic acid and carboxylic acid groups, or preferably sodium salts thereof.

When the term "sulfonic ion exchange groups" or "sulfonyl" is used, it includes not only the sulfonic acid group but particularly the sodium salts thereof. Similarly, the term "carboxylic ion exchange groups" or "carboxyl" means the carboxylic acid group and particularly the sodium salts thereof.

Conversion to ionizable functional groups is ordinarily and conveniently accomplished by hydrolysis with acid or base, such that the various functional groups described above in relation to the melt-fabricable polymers are converted respectively to the free acids or the sodium salts thereof. Such hydrolysis can be carried out in an aqueous bath of either a mineral acid or sodium hydroxide. Alkaline hydrolysis is preferred as it is faster and more complete. Use of hot hydrolysis baths, suitably near the boiling point of the solution, is preferred for rapid hydrolysis. The time required for hydrolysis increases with the thickness of the structure. It is advantageous to include in the hydrolysis bath a water-miscible organic compound such as dimethyl sulfoxide to swell the membrane and thus increase the rate of hydrolysis.

The equivalent weight of the carboxyl layer should be 500-1400, preferably 670-1250, most preferably 770-1100. Higher equivalent weights may be used for thin carboxyl layers, while lower equivalent weights may be used for carboxyl polymers with short pendant side chains containing the terminal carboxyl group.

The equivalent weight of the sulfonate polymer should be low enough to give low membrane resistance or low electrolysis voltage, but not so low as to give a membrane which is too soft or sticky when wet for convenient handling and installation in a cell. In the case where the side chain is —$O$—$CF_2$—$CF(CF_3)$—$O$—$CF_2CF_2$—$SO_3H$ or its salt, the equivalent weight should be 700-1500, preferably 800-1300, and most preferably 900-1100. Lower equivalent weights may be used when the side chain containing the sulfonate group is short. Optionally, but not ordinarily, the sulfonic acid layer may have an equivalent weight lower than that of the adjacent carboxyl layer.

The membrane or bimembrane may be used flat in various known filter press cells, or may be shaped around an electrode. The latter is especially useful when it is desired to convert an existing diaphragm cell to a membrane cell in order to make higher quality caustic.

Membranes can be swelled with polar solvents (such as lower alcohols or esters, tetrahydrofuran, or chloroform) and then dried, preferably between flat plates, to improve their electrolytic performance. Before mounting in commercial cell support frames, which may be 1-5 meters on a side, the membrane can be swelled so that it will not wrinkle after it is clamped in the frame and exposed to electrolytic fluids. Among the swelling agents that can be used are water, brine, caustic, lower alcohols, glycols, or mixtures thereof. See, for example, U.S. Pat. No. 4,595,476 (Bissot, assigned to Du Pont). One of the advantages of the present invention is that membrane defects such as crimps, which lead to pin holes, are less likely to develop during handling the wet preswelled membrane.

The cell can have two or three compartments, or even more. If three or more compartments are used, the membrane is commonly placed next to the cathode compartment, and the other dividers may be porous diaphragms or membranes based on polymers having pendant side chains with terminal —CF$_2$SO$_3$Na groups only. The cells may be connected in series (so-called bipolar cells) or in parallel (so-called monopolar cells).

The membrane may be disposed horizontally or vertically in the cell, or at any angle from the vertical.

Any of the conventional electrodes or electrode configurations may be used. The anode should be resistant to corrosion by brine and chlorine and to erosion and preferably should contain an electrocatalyst to minimize chlorine overvoltage. A commercially available anode known as a dimensionally-stable anode (or DSA) is one of those that are suitable. A suitable base metal is titanium, and the electrocatalysts include reduced platinum group metal oxides (such as Ruthenium and the like), singly or in mixtures, optionally admixed with a reduced oxide of Ti, Ta, Cb, Zr, Hf, V, Pt, or Ir. The electrocatalysts may be heat-treated for stability.

The anode may be a "zero-gap" anode, against which the membrane is urged and which anode is permeable to both liquids and gases. The anode may be kept a small distance from the membrane by the use of a spacer, against which the membrane is urged by a small hydraulic head on the other side of the membrane. The spacer may be made of a plastic which is resistant to the chemicals in the anolyte, such as polytetrafluoroethylene, ethylene/tetrafluoroethylene copolymer, or polychlorotrifluoroethylene. It is desirable that the spacer or the electrode have open vertical channels or grooves to facilitate the escape of gas evolved at the anode. Whether or not there is a spacer, it may be desirable to have the anode openings slanted, so that the gas is carried away from the membrane, and anolyte circulation past the membrane is maximized. This effect can be augmented by using downcomers for anolyte which has been lifted by the rising gas bubbles. The anode may be a screen or perforated plate or powder which is partially embedded in the anode surface layer of the bimembrane. In this case, the current may be supplied to the anode by current distributors which contact the anode at numerous closely-spaced points. The anode may be a porous catalytic anode attached to or pressed against the membrane or attached to or pressed against a porous layer, which is in turn attached to or pressed against the membrane.

The cathode should be resistant to corrosion by the catholyte, resistant to erosion, and preferably will contain an electrocatalyst to minimize hydrogen overvoltage. The cathode may be, for example, mild steel, nickel, or stainless steel, and the electrocatalyst may be platinum black, palladium, gold, spinels, manganese, cobalt, nickel, Raney nickel, reduced platinum group metal oxides, alpha-iron or the like.

The cathode may be a "zero-gap" cathode, against which the membrane is urged and which cathode is permeable to both liquids and gases. The cathode may be kept a small distance from the membrane by the use of a spacer, against which the membrane is urged by a small hydraulic head on the other side of the membrane. In the case of a three-compartment cell, both membranes may be urged against electrodes or spacers by a hydraulic head on the center compartment. The spacer may be made of a plastic which is resistant to the chemicals in the catholyte, such as polytetrafluoroethylene, ethylene/tetrafluoroethylene resin, or polychlorotrifluoroethylene. It is desirable that the cathode spacer or electrode have open vertical channels or grooves to facilitate the escape of gas evolved at the cathode. Whether or not there is a spacer, it may be desirable to have the cathode openings slanted so the gas is carried away from the membrane and catholyte flow past the membrane is maximized. This effect may be augmented by using downcomers for catholyte which has been lifted by rising gas bubbles. The cathode may be a porous cathode, pressed against the membrane or pressed against a porous layer, which is in turn attached to or pressed against the membrane.

An oxygen cathode can be used, in which oxygen is supplied to the cathode and substantially no hydrogen is evolved, with lower cell voltage as a result. The oxygen may be supplied either by bubbling through the catholyte and against the cathode, or by feeding oxygen-containing gas through a porous inlet tube which also serves as cathode and is coated with electrocatalyst.

It has long been known that it is desirable in the electrolysis of brine to use sodium chloride of low Ca and Mg content. It is also well known how to remove hardness from sodium chloride solutions to very low levels. Heavy metals like iron and mercury and foreign anions such as iodide should also be substantially removed. Some of the contaminants in make-up brine can be removed by passing the brine through a diaphragm cell before it is fed to the membrane cell system. Further hardness reductions can be achieved by passing the brine through a chelate ion exchanger, preferably one containing —NHCH$_2$COOH groups.

Brine (NaCl) fed to the cell is usually close to its saturation concentration, which is about 26% by weight both at room temperature and at about 80° C., but a slightly lower brine concentration is acceptable. Brine concentrations in the anolyte compartment are measured on exit brine. By the time the brine concentration is measured by hydrometer, the brine has usually cooled to close to room temperature. Exit brine concentration may be as low as about 18% or 204 grams per liter (g/l) if it is desired to make 42% caustic, but must be much higher, preferably 25% or 297 g/l, if it is desired to make 54% caustic. The usual way to control brine concentration is to control brine feed rate, which causes the anolyte to overflow to resaturation equipment.

While this process makes concentrated caustic, it should be started up at more conventional conditions. First, the membrane is converted to the Na salt form by treatment with an aqueous solution of about 2% sodium hydroxide or sodium bicarbonate and is installed in the cell. The cell is charged with caustic at less than 35% NaOH concentration, preferably less than 30%, and with 15-26% brine, preferably about 18%, with pH equal to or greater than 2. The electrolyzer is heated to 65°-90° C., and flow of current is started gradually, so that the cell voltage does not exceed 4.0 volts (V). Flow of saturated brine to the anolyte and water to the catholyte is started, and the operation is stabilized at 25-35% caustic, preferably 32-33%.

Because a bimembrane or multi-layer membrane containing one or more sulfonyl layers has lower electrical resistance than an all-carboxylate membrane, it can be operated at lower voltage or higher current density. Good results can be obtained at 2-5 kA/m$^2$, preferably 3-4 kA/m$^2$.

It is desirable to acidify the anolyte to minimize the formation of oxygen and chlorate at the anode. Overacidification is not as serious an error in the case of a carboxyl/sulfonyl bimembrane as in the case of an all-carboxylate membrane, because the —CF$_2$SO$_3$H group is a stronger acid than the —CF$_2$COOH group, and the sulfonate form, —CF$_2$SO$_3$—, resists conversion to the acid form by overacidification more strongly than does the carboxylate ion form. The free acids are to be avoided because they increase membrane voltage.

Anolyte acidity is normally adjusted to a pH value in the range of 1-5 by addition of hydrochloric acid or hydrogen chloride to the recycle brine. Recycle brine may be concentrated by addition of solid salt and/or by evaporating or distilling water from the stream.

While membrane cells are frequently operated at approximately atmospheric pressure, there can be advantages to operating them at elevated pressure. While direct current is ordinarily used in membrane cells, one can also use pulsed direct current or half-wave alternating current or rectified alternating current or direct current with a square wave.

Brine electrolysis is normally carried out at a temperature of about 70°-110° C., preferably 80°-100° C. At temperatures above about 100° C., pressure cells should be used.

The membranes described herein can be used as a substrate to carry an electrocatalyst composition on either surface or both surfaces thereof, the resulting article being a composite membrane/electrode.

Such electrocatalyst can be of a type known in the art, such as those described in U.S. Pat. Nos. 4,224,121; 3,134,697; and 4,210,501. Preferred cathodic electrocatalysts include platinum black, Raney nickel and ruthenium black. Preferred anodic electrocatalysts include platinum black and mixed ruthenium and iridium oxides.

The membranes described herein can also be modified on either surface or both surfaces thereof so as to have enhanced gas release properties, for example by providing optimum surface roughness or smoothness, or, preferably, by providing thereon a gas- and liquid-permeable porous non-electrode layer. Such non-electrode layer can be in the form of a thin hydrophilic coating or spacer and is ordinarily of an inert electroinactive or non-electrocatalytic substance. Such non-electrode layer should have a porosity of 10 to 99%, preferably 30 to 70%, and an average pore diameter of 0.01 to 2000 micrometers, preferably 0.1 to 1000 micrometers, and a thickness generally in the range of 0.1 to 500 micrometers, preferably 1 to 300 micrometers. A non-electrode layer ordinarily comprises an inorganic component and a binder; the inorganic component can be an inorganic compound which is chemically stable in hot concentrated caustic and chlorine, and can be of a type as set forth in U.S. Pat. No. 4,661,218 (Oda et al., assigned to Asahi Glass), preferably tin oxide, titanium oxide, silicon carbide, or zirconium oxide. The particle size of the inorganic material can be about 1-100 micrometers, and preferably 1-10 micrometers.

The coating density should be 1-10 g of coating per square meter of membrane ($g/m^2$), preferably 2-6 $g/m^2$.

The binder component in the non-electrode layer can be, for example, polytetrafluoroethylene, a fluorocarbon polymer at least the surface of which is hydrophilic by virtue of treatment with ionizing radiation in air, or a modifying agent to introduce functional groups such as —COOH or —$SO_3H$ (as described in U.S. Pat. No. 4,287,032 [Pellegri, assigned to Oronzio de Nora)] or treatment with an agent such as sodium in liquid ammonia, a functionally substituted fluorocarbon polymer or copolymer which has carboxylate or sulfonate functional groups, or polytetrafluoroethylene particles modified on their surfaces with fluorinated copolymers having acid type functional groups (U.S. Pat. No. 4,661,218, Oda et al., assigned to Asahi Glass). Such binder can be used in an amount of about from 10 to 50% by wt. of the non-electrode layer. In addition to the inorganic component and the binder, the dispersion used to apply the inorganic component can include a thickener such as methyl cellulose or polyvinyl alcohol and a small amount of nonionic surfactant.

Composite structures having non-electrode layers thereon can be made by various techniques known in the art, which include preparation of a decal which is then pressed onto the membrane surface, spray application of a slurry in a liquid composition (for example, dispersion or solution) of the binder followed by drying, screen or gravure printing of compositions in paste form, hot pressing of powders distributed on the membrane surface, and other methods disclosed in the art. Such structures can be made by applying the indicated layers onto membranes in melt-fabricable form, and by some of the methods onto membranes in ion-exchange form; the polymeric component of the resulting structures when in melt-fabricable form can be hydrolyzed in known manner to the ion-exchange form.

On the anolyte side, the membrane may have a bubble release coating. This may be a non-electrode coating as described above, and suitably may be $ZrO_2$. Another way to provide this gas-release coating is to provide optimum surface roughness or smoothness by hot roll embossing or by embossing with a porous paper. When embossing with a porous paper, a release paper can be applied to an outer surface of the membrane prior to passing through a laminator used, for example, to incorporate a reinforcement in the membrane. Such surface embossing is further described in U.S. Pat. No. 4,349,422 (Maloney, assigned to Du Pont). Preferably, the resulting surface roughness is about 2-5 micrometers as measured, for example, with a Bendix Model 1020 profilometer.

Membranes which carry thereon one or more non-electrode layers can be employed in an electrochemical cell in a narrow-gap or zero-gap configuration as described above.

EXAMPLES

Example 1

A membrane is made by heat laminating together in a known fashion three materials, stacked in the following order:

a) a coextruded film of 51 micrometers of a copolymer of tetrafluoroethylene and $CF_2$=CF—O—$CF_2CF(CF_3)$—O—$CF_2CF_2$—$COOCH_3$, having an equivalent weight of 1050, and 102 micrometers of a copolymer of tetrafluoroethylene and $CF_2$=CF—O—$CF_2$—$CF(CF_3)$—O—$CF_2$—$CF_2$—$SO_2F$, having an equivalent weight of 1080, with the —$SO_2F$ side toward material (b), b) a calendered triaxial fabric with 65±5% openness made from a 100-denier monofilament fluorocarbon polymer, and c) a film of 51 micrometers of a copolymer of tetrafluoroethylene and $CF_2$=CF—O—$CF_2$—$CF(CF_2)$—O—$CF_2$—$CF_2$—$SO_2F$, having an equivalent weight of 1080.

This laminate is hydrolyzed to the $K^+$ form at 85° C. in a solution of 10% KOH, 30% dimethyl sulfoxide, and 60% water for one hour at 90° C., then rinsed in water, blotted dry, and tested for tensile properties. The values reported in Table I show uniform tensile strength and modulus in machine, transverse and bias directions. While the values in the machine and transverse directions are expected to be lower than those for biaxial-weaves, the higher values in the bias direction combined with satisfactorily high values in the machine and transverse directions result in a more stable membrane.

The hydrolyzed laminate is preswelled in 2% NaOH at room temperature, then installed in a laboratory cell with an effective membrane diameter of about 7.5 cm, using a mild steel cathode, an anode of titanium activated with a coating containing ruthenium oxide, and the membrane is urged against the anode by catholyte head. Purified saturated NaCl is used as anolyte. Electrolysis is carried out conventionally at 90° C. and 3.1 kA/m$^2$ current density to make 32 wt. % NaOH. The results are shown in Table I.

COMPARATIVE EXAMPLE A

Using the procedure of Example 1, the membrane of this comparative example was made. A leno weave fabric made of a monofilament of the same material as in (b) of Example 1 was used in place of the calendered triaxial fabric of (b). Leno weave fabrics are the best prior art fabrics for openness and therefore low voltage. The fabric has 8 pairs per centimeter of 100 denier monofilament in the machine direction and 8 picks per centimeter of 200 denier monofilament in the transverse direction, and an openness of 65±5%. The lamination, hydrolysis, and blotting were the same as described in Example 1. Moduli were measured for all three directions and the results are in Table I.

A laminate preswelled and mounted in a laboratory cell, when used to electrolyze NaCl in the same fashion as in Example 1, yields the results shown in Table I.

TABLE I

| Physical Tests | Ex. 1 | Comp. A |
|---|---|---|
| tensile modulus, N/m | | |
| machine direction | 85000 | 106000 |
| transverse direction | 85000 | 118000 |
| bias* direction | 85000 | 31000 |
| NaCl Electrolysis | | |
| days on line | 15 | 17 |
| final caustic current efficiency, % | 95 | 95 |
| final cell voltage, V | 3.50 | 3.55 |

*45° angle to the machine direction

We claim:

1. A membrane comprising at least one ion exchange resin, in which at least 90% of the carbon-hydrogen bonds have been replaced with carbon-halogen bonds, reinforced with a yarn system having yarns oriented in at least three directions, which yarn system is made of yarns comprising at least one polymer resistant at temperatures of intended use to chemicals to which the membrane is to be exposed during said use and such membrane has a fabric openness of 40-95%.

2. The membrane of claim 1 wherein ion exchange resin is a cation exchange resin, the intended use is chloralkali electrolysis, and the yarn polymer is resistant to chlorine, sodium hypochlorite, and concentrated sodium hydroxide at 100° C.

3. The membrane of claim 1 wherein the multiaxial yarn system is woven, interstitched or interknitted.

4. The membrane of claim 2 wherein the multiaxial yarn system is woven, interstitched or interknitted.

5. The membrane of claim 1 wherein the multiaxial yarn system is non-woven.

6. The membrane of claim 3 wherein the multiaxial yarn system is a triaxial fabric.

7. The membrane of claim 4 wherein the multiaxial yarn system is a triaxial fabric.

8. The membrane of claim 7 wherein the polymer of which the yarns are made is perfluorinated.

9. The membrane of claim 8 wherein the polymer of which the yarns are made is a homopolymer or copolymer of tetrafluoroethylene.

10. The membrane of claim 2 wherein the yarns have an aspect ratio of 2-20.

11. The membrane of claim 10 wherein the yarns have an aspect ratio of 5-10.

12. The membrane of claim 7 wherein the denier is 5-400.

13. The membrane of claim 12 wherein the fabric openness is 60-85% and the denier is 25-200.

14. The membrane of claim 2 wherein at least some of the yarn comprises sacrificial fiber.

15. The membrane of claim 3 wherein the yarn system is interstitched or interknitted and the yarn that holds the yarn system together comprises sacrificial fiber.

16. The membrane of claim 2 wherein the membrane is a bimembrane.

17. The membrane of claim 13 wherein the membrane is a bimembrane.

* * * * *